(12) United States Patent
Astoria et al.

(10) Patent No.: US 12,421,564 B2
(45) Date of Patent: Sep. 23, 2025

(54) IRON (DRI) BETWEEN A DRI SOURCE AND PROCESSING EQUIPMENT FOR THE DRI

(71) Applicant: Midrex Technologies, Inc., Charlotte, NC (US)

(72) Inventors: Todd Michael Astoria, Harrisburg, NC (US); James Lloyd Lewis, Jr., Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 0 days.

(21) Appl. No.: 18/213,376

(22) Filed: Jun. 23, 2023

(65) Prior Publication Data

US 2023/0332259 A1 Oct. 19, 2023

Related U.S. Application Data

(62) Division of application No. 17/209,561, filed on Mar. 23, 2021, now Pat. No. 11,965,221.

(Continued)

(51) Int. Cl.
- *C21B 13/02* (2006.01)
- *C21B 13/00* (2006.01)
- *F27B 1/21* (2006.01)
- *F27D 5/00* (2006.01)
- *F27D 11/06* (2006.01)
- *F27D 99/00* (2010.01)

(52) U.S. Cl.
CPC ........ *C21B 13/026* (2013.01); *C21B 13/0086* (2013.01); *F27B 1/21* (2013.01); *F27D 5/0062* (2013.01); *F27D 11/06* (2013.01); *F27D 99/0006* (2013.01); *F27D 2099/0015* (2013.01)

(58) Field of Classification Search
CPC ....................................................... F27B 14/061
See application file for complete search history.

(56) References Cited

U.S. PATENT DOCUMENTS

| 3,612,577 A | 10/1971 | Pope et al. |
| 3,740,042 A | 6/1973 | Baum |

(Continued)

FOREIGN PATENT DOCUMENTS

| CN | 201187944 Y | 1/2009 |
| CN | 103484674 A | 1/2014 |

(Continued)

OTHER PUBLICATIONS

Duarte Pe et al: "Hytemp DRI Transfer to Thin Slab Casting Facility at Hylsa", Aise Steel Technology, Aise, Pittsburg, PA, US, vol. 73, No. 11, Nov. 1, 1996 (Nov. 1, 1996), pp. 38-41, XP000641626, ISSN: 0021-1559.

(Continued)

*Primary Examiner* — Keith D. Hendricks
*Assistant Examiner* — Nikolas Takuya Pullen
(74) *Attorney, Agent, or Firm* — Clements Bernard Walker; Christopher L. Bernard; Devin Cummins (57) ABSTRACT

A method of heating direct reduced iron between a direct reduced iron source and processing equipment for the direct reduced iron, comprises providing a conduit heater assembly (Continued)

between the direct reduced iron source and the processing equipment, wherein the conduit heater assembly receives a flow of the direct reduced iron from the direct reduced iron source and heats the direct reduced iron as the direct reduced iron flows through the conduit heater assembly and to the processing equipment.

6 Claims, 5 Drawing Sheets

Related U.S. Application Data (60) Provisional application No. 62/993,836, filed on Mar. 24, 2020.

(56) References Cited

U.S. PATENT DOCUMENTS

| | | | |
|---|---|---|---|
| 3,844,761 | A | 10/1974 | Newallis et al. |
| 3,844,765 | A | 10/1974 | Baum |
| 3,918,956 | A | 11/1975 | Baum |
| 4,464,197 | A | 8/1984 | Calderon |
| 5,332,200 | A | 7/1994 | Gorin |
| 5,376,774 | A | 12/1994 | McGaffigan et al. |
| 5,783,141 | A | 7/1998 | Patel |
| 7,767,136 | B2 | 8/2010 | Argenta et al. |
| 2003/0097908 | A1 | 5/2003 | Hoffman et al. |
| 2006/0096675 | A1 | 5/2006 | Shoichi |
| 2009/0084457 | A1 | 4/2009 | Tsuchie et al. |
| 2017/0009309 | A1 | 1/2017 | Motamedhashemi |
| 2017/0058373 | A1 | 3/2017 | Motamedhashemi |
| 2019/0017745 | A1 | 1/2019 | Buragino |

FOREIGN PATENT DOCUMENTS

| | | |
|---|---|---|
| CN | 109055643 A | 12/2018 |
| DE | 19900232 C1 | 2/2000 |
| EP | 3495512 A1 | 6/2019 |
| EP | 3543634 A1 | 9/2019 |
| WO | 0036160 A1 | 6/2000 |
| WO | 2019070699 A | 4/2019 |

OTHER PUBLICATIONS

EESR (May 7, 2024).
OA1 Brazil (Jul. 30, 2024).
Jun. 4, 2021 International Search Report issued on International Application No. PCT/US21/23804.
Kazemi, M., Sichen, D. Effect of Experimental Conditions on Cementite Formation During Reduction of Iron Ore Pellets. Metall Mater Trans B 47, 3519-3526 (2016) (Year: 2016).
Cleveland, Cutler J. Morris, Christopher. Dictionary of Energy (Expand Edition)—(2009). p. 106 (Year: 2009).
Elisa Pinto da Rocha, Jose Adilson de Castro, Leonardo Silva, Rayla de Souza Caldas. Computational Analysis of the Performance of Shaft Furnace with Partial Replacement of The Burden with Self-Reducing Pellets Containing Biomass, 2019, Materials Research 22(6): e20190533 (Year: 2019).
Office Action issued in corresponding Venezuelan Patent Application No. VE 2021-000064.

IRON (DRI) BETWEEN A DRI SOURCE AND PROCESSING EQUIPMENT FOR THE DRI

CROSS-REFERENCE TO RELATED APPLICATION

The present disclosure is a divisional of U.S. Non-Provisional patent application Ser. No. 17/209,561, filed on Mar. 23, 2021, which claims the benefit of priority of U.S. Provisional Patent Application No. 62/993,836, filed on Mar. 24, 2020, and entitled "MIDREX HOT DRI REHEATING," the contents of each of which are incorporated in full by reference herein.

TECHNICAL FIELD

The present invention relates generally to the direct reduced iron (DRI) and steelmaking fields. More specifically, the present invention relates generally to a direct reduction process utilizing electric heating means to add or recover heat to the DRI prior to metallic iron processing following the reduction process.

BACKGROUND

Hot Direct Reduced iron (HDRI) is distributed at about 700-750° C. via insulated steel conduits or feed legs from a DRI furnace to, among other processes, briquetting machines to form hot briquetted iron (HBI), which must be formed at a temperature of no less than 650° C. Other processes may include hot transport as a means for charging melt furnaces, alternately, containment vessels, conveyors, or gravity-flow conduits, other hot compaction methods, or additional chemical conversion processes such as carburization.

At the melting operation employing, preferably, an electric arc furnace (EAF), but possibly other melting furnaces, HDRI may have cooled to as low as about 550-600° C. HDRI is charged to a surge bin to contain the material and retain its heat as much as possible, and then to feed the melter as needed. Overcoming the heat losses between the high point of about 700-750° C. and the feed point to the melter, about 550-600° C. is an opportunity to improve quality and energy efficiency. Adding heat to the DRI prior to melting is an opportunity to improve melting furnace efficiency and throughput.

DRI quality can be deleteriously affected by HDRI cooling in the feed legs, with compaction density and strength decreasing, and, secondarily, cementite content, which is needed for metal quality, decreasing. HDRI may cool as much as about 50° C. in the feed legs depending on several factors which may or may not be within the control of the plant operations. It is optimal to briquette at about 680° to 720° C., but no less than 650° C., to make briquette densities above 5.0 g/cm$^3$ and to improve tumble index values by as much as 3% without continued operation above about 720° C. Briquettes formed at about 715° C. generally are superior quality briquettes, exhibiting greater weathering resistance and lower breakage as measured by metallization loss and fines generation. While briquetting at higher temperatures can make higher quality HBI, continued operation above about 720° C. results in unacceptably high maintenance on briquetting machinery such as briquette machine feed screws.

Additionally, there is published research which points to an optimal cementite (iron carbide) retention at about 750° C. Cementite stability is highest in the 730 to 750° C. range, with decomposition occurring more rapidly outside that range. Cementite is the most desirable form of carbon content in HBI for steelmaking. Optimizing the HDRI temperature near this range helps avoid decomposition of cementite into graphitic carbon.

BRIEF SUMMARY OF THE INVENTION

Therefore, a primary aim of embodiments of the present invention is to arrest and maintain HDRI temperature at or near 715-720° C. through the use of an induction heating means arranged on the feed legs either as, e.g., a supplemental design, or as a replacement feed leg design. Problems advantageously solved include: 1) overcoming heat losses in feed legs prior to briquetters; and 2) help achieve and/or retain the desired level of carbon in HBI.

Another primary aim of embodiments of this invention is to reheat or preheat HDRI prior to melter charging, using a new design for the HDRI surge bin discharge. Further problems advantageously solved include how to: 1) reheat HDRI prior to melter (bring HDRI back to about 700°–750° C.); and 2) preheat material to a higher level (e.g., about 1000° C.) for melter charging.

Thus, in various exemplary embodiments, the present invention provides a method of heating direct reduced iron between a direct reduced iron source and processing equipment for the direct reduced iron. The method comprises providing a conduit heater assembly between the direct reduced iron source and the processing equipment, wherein the conduit heater assembly receives a flow of the direct reduced iron from the direct reduced iron source and heats the direct reduced iron as the direct reduced iron flows through the conduit heater assembly and to the processing equipment. The direct reduced iron can be hot direct reduced iron from a direct reduction shaft furnace or a direct reduced iron reheating furnace. The direct reduced iron source can be at least one of a direct reduction shaft furnace, a direct reduced iron reheating furnace, a surge bin, a hot direct reduced iron feed bin, a splitter, and a rotary feeder. The processing equipment can be at least one of a melter, a briquetting machine, and a hot compaction equipment to compact to a higher density. The conduit heater assembly can comprise a conduit configured to receive a flow of direct reduced iron; and a heating element disposed adjacent to the conduit; wherein the heating element is configured to transfer energy from a power supply in the form of heat to the conduit and heat the flow of direct reduced iron through the conduit. The heating element can comprise induction heating coils. The conduit can comprise an insulated outer pipe, and an inner pipe forming an inner conduit and located inside the insulated outer pipe and configured to receive the flow of direct reduced iron; and wherein the heating element can be disposed concentrically around an outer surface of the inner conduit and within the insulated outer pipe. The heating element can comprise conductive metallic (e.g., copper tubing) induction coils affixed to an outer perimeter of the inner pipe within the insulated outer pipe and configured to provide magnetic flux to indirectly heat the direct reduced iron. A carburizing gas injection can be located downstream or upstream of the coils providing a flow of carburizing gas through the conduit. The conduit can transition to an annular shaped flow path to receive the flow of direct reduced iron and the heating element comprises a parallel set of induction coils. The conduit can transition to a rectangular shaped flow path and the heating element comprises rectangular pancake induction coils. The direct reduced iron can be reheated to between about 700° C. to 750° C. and preheated to about 1000° C. or greater. The hot direct reduced iron can be heated to about 730° C. to stabilize cementite content and minimize further decomposition.

In various exemplary embodiments, the present invention also provides a system for heating direct reduced iron between a direct reduced iron source and processing equipment for the direct reduced iron. The system comprises a direct reduced iron source; processing equipment for the direct reduced iron; and a conduit heater assembly coupling the direct reduced iron source and the processing equipment and located between the direct reduced iron source and the processing equipment. The conduit heater assembly is configured to receive a flow of the direct reduced iron from the direct reduced iron source and heat the direct reduced iron as the direct reduced iron flows through the conduit heater assembly and to the processing equipment. The conduit heater assembly can comprise a conduit configured to receive a flow of direct reduced iron; and a heating element disposed adjacent to the conduit; wherein the heating element is configured to transfer energy from a power supply in the form of heat to the conduit and heat the flow of direct reduced iron through the conduit. The heating element comprises induction heating coils. The system can be configured to perform at least one of reheating the direct reduced iron to between about 700° C. to 750° C. and preheating the direct reduced iron to about 1000° C. or greater.

In various exemplary embodiment, the present invention further provides a feed conduit heater assembly comprising a conduit configured to receive a flow of direct reduced iron; and a heating element disposed adjacent to the conduit. The heating element is configured to transfer energy from a power supply in the form of heat to the conduit and heat the flow of direct reduced iron through the conduit. The conduit can comprise an insulated outer pipe, and an inner pipe forming an inner conduit and located inside the insulated outer pipe and configured to receive the flow of direct reduced iron. The heating element can comprise induction coils disposed concentrically around an outer surface of the inner conduit and within the insulated outer pipe.

BRIEF DESCRIPTION OF THE DRAWINGS

The present invention is illustrated and described with reference to the various drawings, in which like reference numbers are used to denote like method steps/system/apparatus components, as appropriate, and in which.

DETAILED DESCRIPTION OF THE INVENTION

Again, a primary aim of embodiments of the present invention is to arrest and maintain HDRI temperature at or near 715-720° C. through the use of an induction heating means arranged on the feed legs either as, e.g., a supplemental design, or as a replacement feed leg design. Problems advantageously solved by embodiments and detailed below include: 1) overcoming heat losses in feed legs prior to briquetters; and 2) help achieve and/or retain the desired level of carbon in HBI. Another primary aim of embodiments of this invention is to reheat or preheat HDRI prior to melter charging, using a new design for the HDRI surge bin discharge. Thus, further problems advantageously solved by embodiments of the invention and detailed below include how to: 1) reheat HDRI prior to melter (bring HDRI back to about 700°-750° C.); and 2) preheat material to a higher level (e.g., about 1000° C.) for melter charging.

Advantageous features of various embodiments of the invention are hereinafter described, which address the foregoing problems.

Induction heating allows the HDRI to be heated without concern for introducing or managing gas flows for heat transfer. Further, induction heating employs electrical energy, one of the most cost effective and efficient energy sources in the plant; electrical power is directly converted to thermal power with high efficiency.

Custom designed and arranged inductive coils advantageously heat the feed leg material, as well as the DRI, adding a radiative and conductive heat transfer component to the DRI stream. The induction field magnetic flux can be designed to match the feed leg geometry and mass flow rate in each plant to achieve optimal penetration into the DRI, while avoiding incipient melting at pellet surfaces that could lead to cluster formation or solid build-up on the feed leg walls.

As a secondary effect, by maintaining the HDRI temperature at about 700° C. or above, it can be advantageous to introduce a carburizing gas stream counterflow to the HDRI, which may be useful to "polish" the carbon level with up to about 0.1% C addition (residence time limitations). The temperature of the carburizing gas stream may be, e.g., between about 700° C. to 950° C. or above, or any other suitable temperature to maintain the desired HDRI temperature. The HDRI will thus be delivered at optimal temperature to the hot briquetters to form high quality briquettes.

The feed leg or conduit, both for the feed leg/conduit to briquetter and the HDRI feed from HDRI feed bin to melter may be constructed as concentric pipes to allow the internal pipe (the actual feeding conduit) to be made of heat and corrosion resistant alloy for carrying the HDRI, while the external pipe is made of carbon steel to provide structural strength. The internal conduit may alternately be constructed of a hard, ceramic refractory material to accomplish the same purpose, with a different magnetic response to induction. Optimally designed induction coils, comprised typically of conductive metallic tubing formed to a specific coil shape, will be affixed to the outer perimeter of the internal pipe in one or more locations to provide the magnetic flux required to inductively heat the HDRI. The coils, being made preferentially of copper tubing, but potentially also from other conductive metals, will be supplied with cooling water to prevent overheating. Coil shape and size will be specific to the feed leg design and mass flow of DRI, as well as required heat input, as desired. The coils can be encased in a ferrite bearing material to act as a magnetic flux concentrator to focus the induced magnetic fields inwardly to the material.

As the HDRI moves through the conduit and induction heating zone, the material will respond to the magnetic flux with, first, induced electrical current in the pellets and, second, conversion of that induced current into heat as it encounters the natural resistance of the pellets. The pellets will not respond uniformly. It is expected that a degree of heat transfer may occur pellet-to-pellet and inner pipe surface (if metallic)-to-pellet as the mass flows through the induction fields (i.e.—a metallic pipe and outer layers of pellets will likely heat faster than the center mass, which may need the additional heat transfer to be heated). To complement this process, it may be desired to use differently shaped coils to heat the core DRI material as compared to the outer layers, in which case the coil sets will be mounted closely together on the internal pipe. Magnetic penetration is an induction parameter that can be optimized, and staging the coils can allow heating to different depths. The coils may be powered by dedicated power supplies, tuned to the optimal frequency to accomplish the heating. These power supplies may be located on an equipment support deck near the feed legs, or on a work platform near the HDRI feed bins.

Alternately, the concentric pipe feed legs may be replaced with annular flow or rectangular flow conduits to allow other styles of induction coils to be deployed. Where more uniform or more intense heating is required, a narrower cross section of material will allow coils to be deployed on both sides of a conduit. For example, an annular conduit can include a receiving cone and cylindrical vessel arranged around an internal flow aid insert cone to spread the flow of material from a 400 mm diameter feed leg to an annular space of an outer diameter of 700 mm and an inner diameter of 550 mm. In this manner, the 400 mm diameter pellet bed would transition via the cone to a narrower width pellet bed, 75 mm wide. Concentrically arranged external and internal coils would induce magnetic fields from both sides of the pellet bed, and provide more intense and uniform heating. The external coil would be fitted to the outside of the cylindrical vessel, similarly to the feed coils described earlier. The internal coils would be mounted inside the flow aid insert device, which would be supported by static shafts to both hold the insert in position and to serve as an access conduit for power and cooling water supply to the internal coil. The heated pellets would then flow into a similar conical transition zone back to the 400 mm diameter conduit.

Further, a rectangular flow arrangement, especially suited for the outflow from the HDRI feed bins, could include a transition from round to rectangular conduit, for example 400 mm diameter to 100×1250 mm inner dimensions. This rectangular duct would be fitted with "pancake" style coils, signifying coils arranged with the coil axis perpendicular to the sides of the conduit, on each side to penetrate the bed of pellets with more intense heating. Discharge could be transitioned into any desired geometry. The foregoing alternate geometries may be deployed where greater heat input is needed such as HDRI reheat or preheat.

Figure 1:
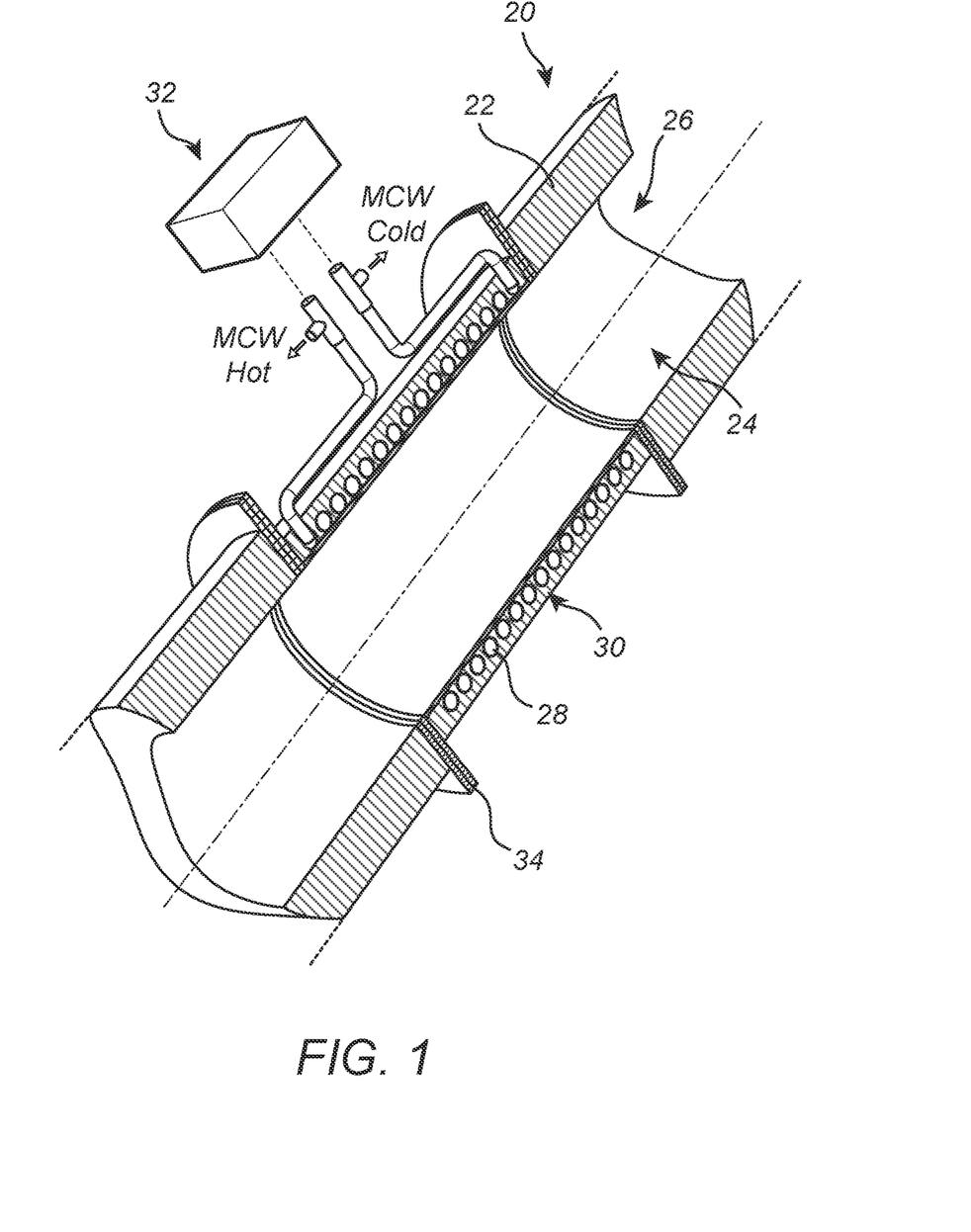
FIG. 1 is a schematic diagram illustrating one exemplary embodiment of a feed leg heating apparatus/feed conduit heater assembly of the present invention.

Referring now specifically to FIG. 1, disclosed therein is a feed leg heating apparatus/feed conduit heater assembly 20 configured especially for the feed leg to briquetter and the HDRI feed from HDRI feed bin to melter, however, other applications are also contemplated. Assembly 20 comprises an insulated outer pipe 22 and an inner feed leg pipe 24 located inside the insulated outer pipe 22 for receiving a HDRI flow 26, as shown in FIG. 1. Thus, according to embodiments, assembly 20 is constructed as concentric pipes to allow the internal pipe 24, which is the actual feeding conduit, to advantageously be made of a heat and corrosion resistant alloy for transporting the HDRI. The internal pipe 24 may also comprise a hard, ceramic refractory material. The assembly 20 further includes a heating element, shown as induction coils 28 in FIG. 1 as affixed to an outer perimeter of the inner feed pipe 24. The coils 28 may comprise copper or other conductive metal tubing formed to a desired coil shape and are affixed at one or more locations on the inner feed leg pipe 24 to provide the magnetic flux need to inductively heat the HDRI. The coils 24 can be supplied with cooling water to prevent overheating. Moreover, the coils 28 may be encased in a ferrite bearing material to act as a magnetic flux concentrator 30. As also illustrated in FIG. 1, the coils 24 can be powered by a dedicated power supply or source 32 tuned to a desired and optimal frequency to provide the desired heated. Thus, the power supply or source 32 can be coupled to the heating element/coils 28. The coils 28 are configured to transfer energy from the power supply 32 in the form of heat to heat the flow of direct iron through the conduit. Supporting flanges 34 are further shown in FIG. 1 and the coils/assembly could be inserted as a spool piece.

Thus, in one exemplary embodiment and as shown in FIG. 1, an advantageous feature is the external induction coils 28 around the inner feed leg pipe (internal conduit/pipe 24). Further advantageous aspects of this embodiment include the inner pipe (alloy or refractory) fitted with coil, water-cooled coil encased in ferritic compound flux concentrator 30, and power supply 32 to coil.

Figure 2:
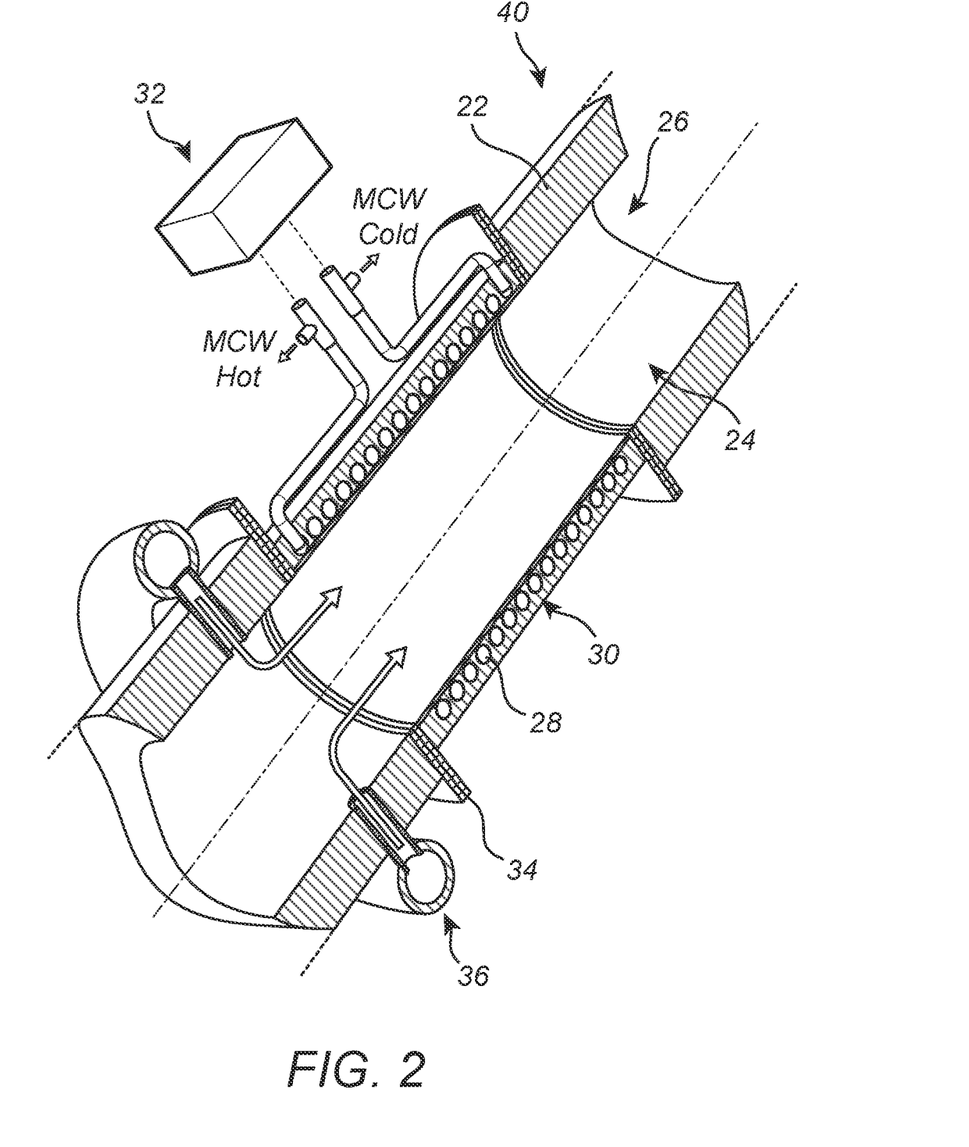
FIG. 2 is a schematic diagram illustrating another exemplary embodiment of the feed leg heating apparatus/feed conduit heater assembly with supplemental carburizing gas injection of the present invention.

Referring now specifically to FIG. 2, disclosed therein is a feed leg heating apparatus/feed conduit heater assembly 40 with supplemental carburizing gas injection 36. As in the case of FIG. 1, assembly 40 is configured especially for the feed leg to briquetter and the HDRI feed from HDRI feed bin to melter, however, other applications are also contemplated. Assembly 40 comprises an insulated outer pipe 22 and an inner feed leg pipe 24 located inside the insulated outer pipe 22 for receiving a HDRI flow 26, as shown in FIG. 2. Thus, according to embodiments, assembly 40 is also constructed as concentric pipes to allow the internal pipe 24, which is the actual feeding conduit, to advantageously be made of a heat and corrosion resistant alloy for transporting the HDRI. The internal pipe 24 may also comprise a hard, ceramic refractory material. The assembly 40 further includes a heating element, shown as induction coils 28 in FIG. 2 as affixed to an outer perimeter of the inner feed pipe 24. The coils 28 may comprise copper or other conductive metal tubing formed to a desired coil shape and are affixed at one or more locations on the inner feed leg pipe 24 to provide the magnetic flux need to inductively heat the HDRI. The coils 24 can be supplied with cooling water to prevent overheating. Moreover, the coils 28 may be encased in a ferrite bearing material to act as a magnetic flux concentrator 30. As also illustrated in FIG. 2, the coils 24 can be powered by a dedicated power supply or source 32 tuned to a desired and optimal frequency to provide the desired heated. Thus, the power supply or source 32 can be coupled to the heating element/coils 28. The coils 28 are configured to transfer energy from the power supply 32 in the form of heat to heat the flow of direct iron through the conduit. Supporting flanges 34 are further shown in FIG. 2 and the coils/assembly could be inserted as a spool piece.

It is noted that while the carburizing gas injection 36 is illustrated in FIG. 2 downstream, it could also be upstream of coils 28. Also, by maintaining the HDRI temperature at about 700° C. or above, it can be especially advantageous to introduce the carburizing gas injection 36 as a counterflow to the HDRI to "polish" the carbon level with up to about 0.1% C addition (residence time limitations). The temperature of the carburizing gas stream may be, e.g., between about 700° C. to 950° C., or any other suitable temperature to maintain the desired HDRI temperature. The HDRI can thus be delivered at optimal temperature to the hot briquetters to form high quality briquettes.

Thus, in this exemplary embodiment and as shown in FIG. 2, this option allows for improved processing by carburizing gas injection to the heated feed leg. Advantageous aspects of this embodiment include feed leg heating apparatus/feed conduit heater assembly as in FIG. 1, and gas injection zone to inject heated carburizing gas 36.

Figure 3:
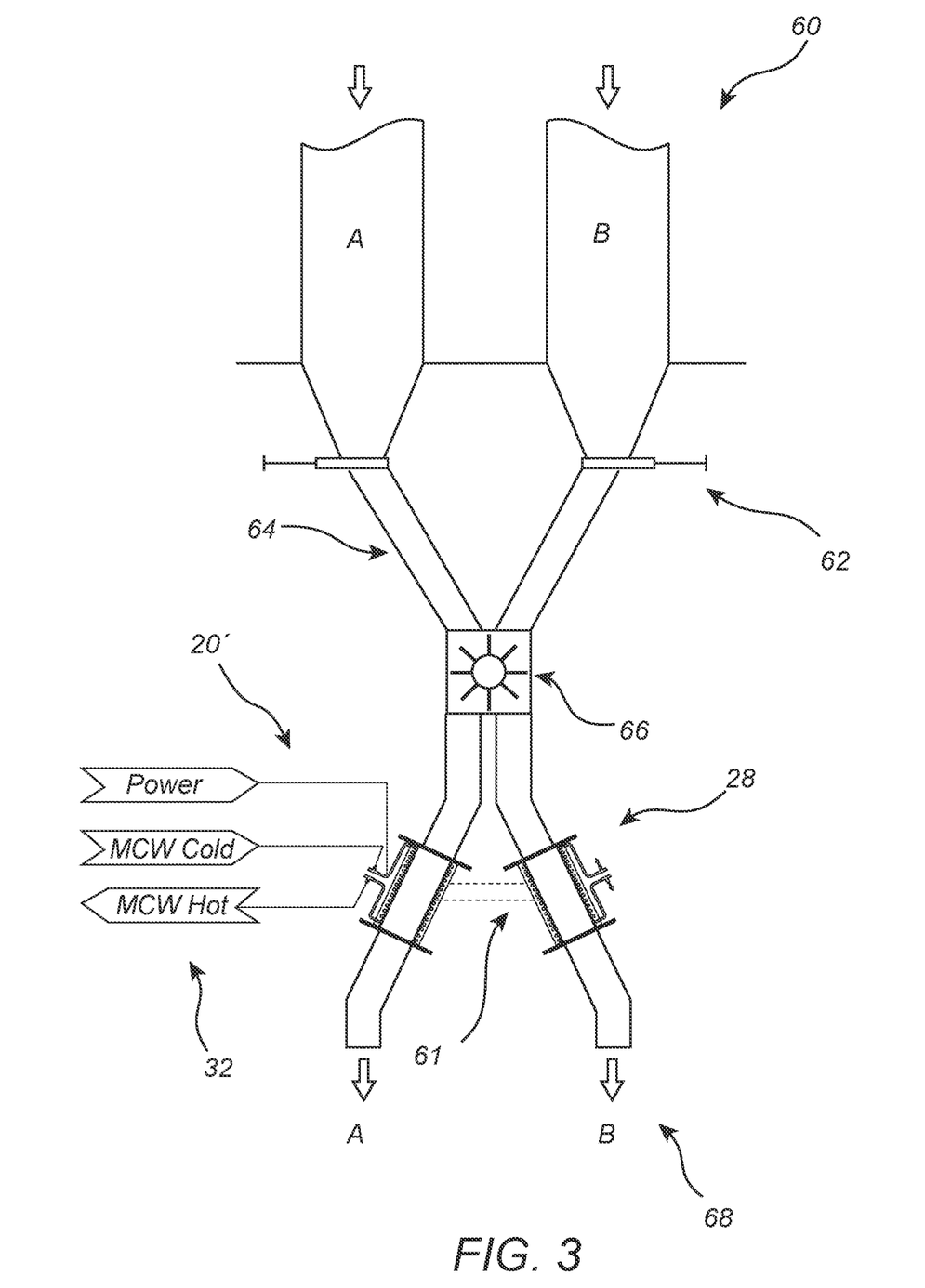
FIG. 3 is a schematic diagram illustrating an exemplary embodiment of a HDRI reheating system/method of the present invention.

Referring now specifically to FIG. 3, disclosed therein is a HDRI reheating system/method 60. This exemplary embodiment advantageously allows fitting of HDRI feed bin discharge legs with induction heating coils. Accordingly, advantageous aspects of this embodiment include replacement of discharge feed leg/conduit with feed leg heating apparatus/feed conduit heater assembly similar to FIG. 1 for HDRI reheat, placement of reheat leg/conduit after rotary feeder, and gas injection zone to inject heated carburizing gas.

FIG. 3 may also be described in the context of a method of heating direct reduced iron between a direct reduced iron source and processing equipment for the direct reduced iron. The method can include providing feed leg heating apparatus/feed conduit heater assembly 20', which is similar to the feed leg heating apparatus/feed conduit heater assembly 20 of FIG. 1, between the direct reduced iron source and processing equipment, wherein the conduit of the assembly 20' (two shown therein) receives a flow of the direct reduced iron from the direct reduced iron source and heats the direct reduced iron as the direct reduced iron flows through the conduit and to the processing equipment, such as a melter at, e.g., melter charge points 68. It will be appreciated that while reference is made in FIG. 3 to particular processing equipment, other processing equipment and positioning the assembly 20' may be employed.

In general, HDRI is produced by reducing iron oxide pellets, lumps and/or agglomerates in a DR shaft furnace or by reheating cold DRI pellets, lumps and/or agglomerates in a DRI reheating furnace (not shown). As shown in exemplary FIG. 3, HDRI can be received in HDRI feed bins A, B. While two feed bins are shown, it will be appreciated that less or more may be employed. HDRI feed bins A, B may be surge bins receiving the flow of the HDRI therein with slide gates 62 employed to control the HDRI flow to ducts 64 receiving the flow of HDRI from the HDRI feed bins A, B to pass the material to rotary feeder 66. Rotary feeder 66 can respond to demands of a downstream melter (not shown). As shown in FIG. 3, the HDRI flowing out of the rotary feeder 66 can enter feed leg heating apparatus/feed conduit heater assembly 20', which is similar to the feed leg heating apparatus/feed conduit heater assembly 20 of FIG. 1. Thus, reference may be made the descriptions of assembly 20 for this embodiment with the addition of an interconnection 61 as two connected conduits are shown in FIG. 3. For example, assembly 20' can similarly comprise an insulated outer pipe 22 and an inner feed leg pipe 24 located inside the insulated outer pipe 22 for receiving a HDRI flow 26, as best seen in FIG. 1. Thus, according to embodiments, assembly 20' can also be constructed as concentric pipes to allow the internal pipe 24, which is the actual feeding conduit, to advantageously be made of a heat and corrosion resistant alloy for transporting the HDRI. The internal pipe 24 may also comprise a hard, ceramic refractory material. The assembly 20' further includes a heating element, shown as induction coils 28 which can be affixed to an outer perimeter of the inner feed pipe 24. The coils 28 may comprise copper or other conductive metal tubing formed to a desired coil shape and are affixed at one or more locations on the inner feed leg pipe 24 to provide the magnetic flux need to inductively heat the HDRI. The coils 24 may be 4 mm in minimum length and can be supplied with cooling water to prevent overheating. Moreover, the coils 28 may be encased in a ferrite bearing material. As also illustrated in FIG. 3, the coils 28 can be powered by a dedicated power supply or source 32 tuned to a desired and optimal frequency to provide the desired heated. Thus, the power supply or source 32 can be coupled to the heating element/coils 28. The coils 28 are configured to transfer energy from the power supply 32 in the form of heat to heat the flow of direct iron through each conduit. It is further noted that the carburizing gas injection 36 shown and described above with reference to FIG. 2 may also be advantageously employed in this embodiment, if desired.

Figure 4:
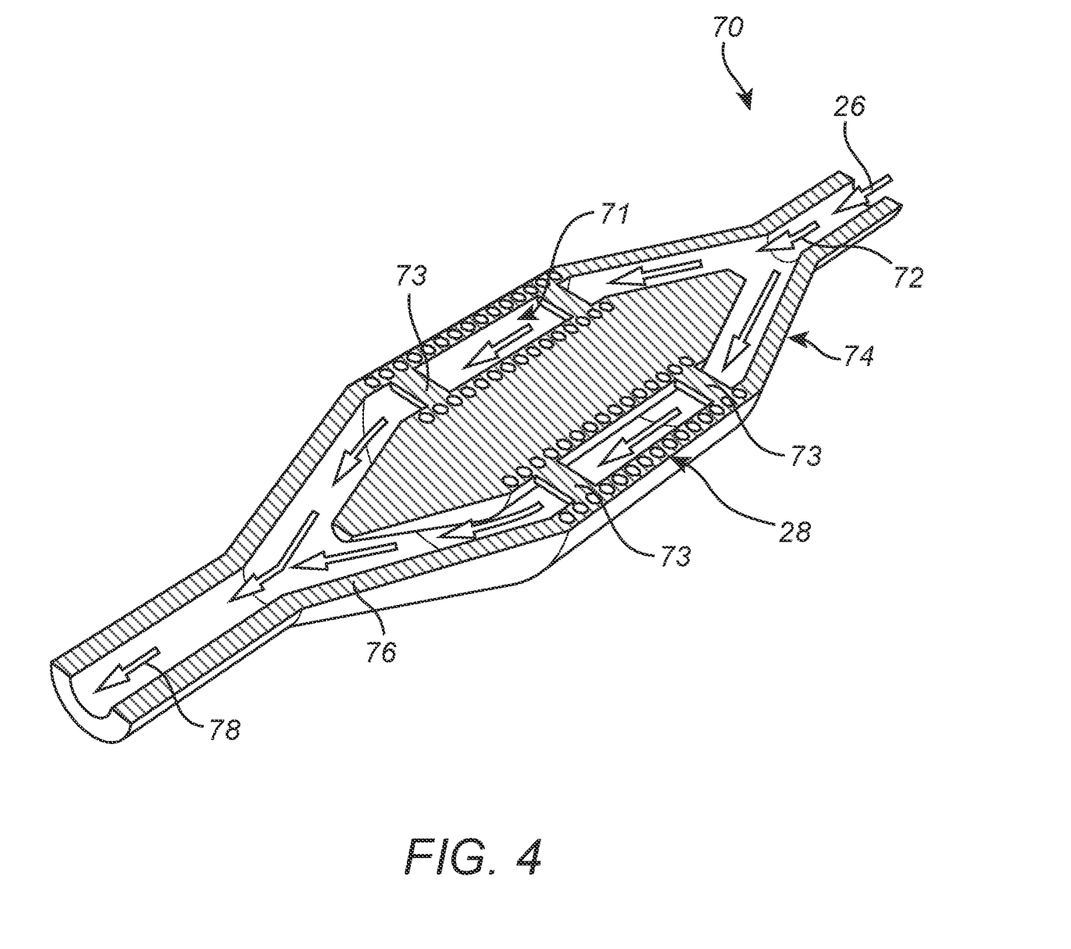
FIG. 4 is a schematic diagram illustrating an exemplary embodiment of a HDRI melter charge preheating assembly of the present invention.

Referring now specifically to FIG. 4, in a still further exemplary embodiment, an alternate flow, annular conduit/ heating assembly 70 designed as an annular flow conduit and especially suited for high power preheating/reheating is shown therein. It is initially noted that this configuration could be an alternative to the concentric pipe feed leg/ conduit configuration described about with respect to FIG. 1. Coils 28 could be provided in parallel as an external and internal coil set, as further described below and in a similar manner as described for FIGS. 1 and 2, but with an additional coiling. As shown in FIG. 4, HDRI flow enters a first portion 72 of conduit 70 at a first diameter and the shape thereof tapers out in a conical transition zone to a greater diameter/width at a second portion 74 transitioning to an annular shape providing an annular shaped flow path for entry of the HDRI. At a third portion 76 the shape thereof tapers at a second conical transition zone and then to fourth portion 78 for exit of the HDRI flow of a diameter substantially the same as that of the first portion 72 where the HDRI flow initially enters. This embodiment advantageously allows arrangement of the external and internal coils 28 to enhance the heating profile of the material, as shown in FIG. 4.

Moreover, this embodiment of FIG. 4 is especially advantageous where a more uniform or more intense heating is required as a narrower cross section of material will allow coils 28 to be deployed on both sides of the conduit. For example, an annular conduit 70 can include a receiving cone and cylindrical vessel arranged around an internal flow aid insert cone to spread the flow of material from a 400 mm diameter feed leg to an annular space 71 of an outer diameter of 700 mm and an inner diameter of 550 mm. In this manner, the 400 mm diameter pellet bed would transition via the cone to a narrower width pellet bed, 75 mm wide. Concentrically arranged external and internal coils 28 induce magnetic fields from both sides of the pellet bed, and provide more intense and uniform heating. The external coil would be fitted to the outside of the cylindrical vessel, similarly to the feed coils 28 described in FIGS. 1 and 2. The internal coils 28 can be mounted inside the flow aid insert device, which can be supported with supports 73 such as static shafts to both hold the insert in position and to serve as an access conduit for power and cooling water supply to the internal coil 28. The heated pellets would then flow into a similar conical transition zone back to the 400 mm diameter conduit. Coils 28 are configured to transfer energy from the power supply 32 (not shown) in the form of heat to heat the flow of direct iron.

Advantageously, this option allows for alternate geometries of HDRI feed bin discharge legs/conduits for HDRI preheat purposes. Further advantageous aspects of this embodiment (option A) include after rotary feeder, transition of round feed legs to annular heating zone with two sets of coils 28 concentrically arranged as external and internal heating coils.

Figure 5:
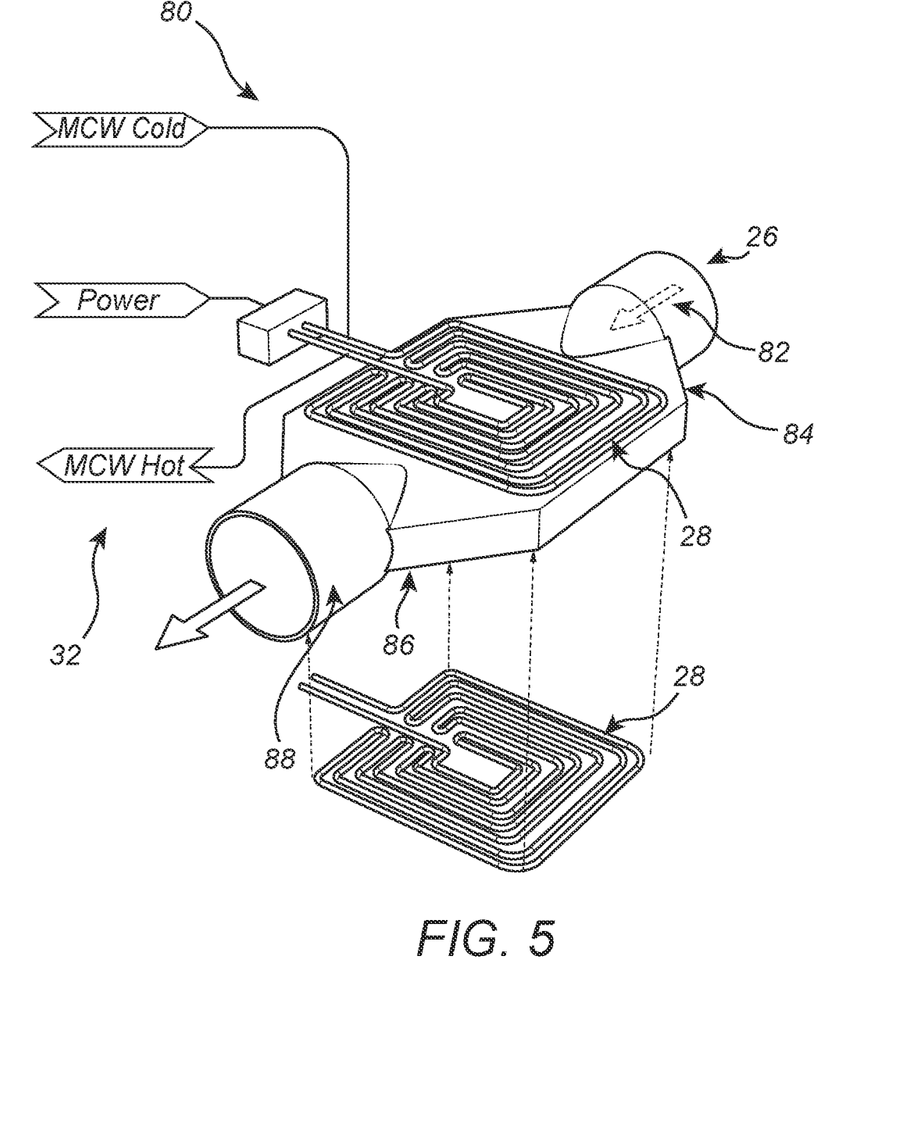
FIG. 5 is a schematic diagram illustrating another exemplary embodiment of a HDRI melter charge preheating assembly of the present invention.

Referring now specifically to FIG. 5, in a still further exemplary embodiment, an alternate flow, rectangular conduit/HDRI melter charge heating assembly 80 designed as a rectangular flow conduit and especially suited for high power preheating/reheating is disclosed. It is initially noted that this configuration could also be an alternative to the concentric pipe feed leg/conduit configuration described about with respect to FIG. 1. Coils could be provided in a "pancake" configuration on each side of the conduit, as shown in FIG. 5 and as further described below. As shown in FIG. 5, HDRI flow enters a first portion 82 of conduit 80 at a first diameter and the shape thereof tapers out in a transition zone to a greater width at a second portion 84 transitioning to rectangular shape providing an rectangular shaped flow path for entry of the HDRI. At a third portion 86 the shape thereof tapers at a second transition zone and then to fourth portion 88 for exit of the HDRI flow of a diameter substantially the same as that of the first portion 82 where the HDRI flow initially enters. However, the exit could also be of different round, square or other suitable shapes. The coils 28 are configured to transfer energy from the power supply 32 in the form of heat to heat the flow of direct iron through the conduit. This embodiment advantageously allows arrangement of coils 28 in a "pancake" configuration to enhance the heating profile of the material, as shown in FIG. 5.

Further, this rectangular flow arrangement, especially suited for the outflow from the HDRI feed bins, could include a transition from round to rectangular conduit at, for example 400 mm diameter to 100×1250 mm inner dimensions. This rectangular duct fitted with "pancake" style coils, signifying coils arranged with the coil axis perpendicular to the sides of the conduit, on each side to penetrate the bed of pellets with more intense heating. Discharge could be transitioned into any desired geometry. The foregoing alternate geometries may be deployed where greater heat input is needed such as HDRI reheat or preheat.

Advantageously, this option also allows for alternate geometries of HDRI feed bin discharge legs/conduits for HDRI preheat purposes. Further advantageous aspects of this embodiment (option B) include after rotary feeder, transition of round feed legs to rectangular heating zone with two sets of "pancake" coils, one on each side of vessel.

Although the present invention is illustrated and described with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are contemplated thereby, and are intended to be covered by the following claims. Additionally, all elements and features described herein may be used in any combination in embodiments.

What is claimed is:

1. A system for heating direct reduced iron between a direct reduced iron source and processing equipment for the direct reduced iron, comprising:
    a direct reduced iron source;
    processing equipment for the direct reduced iron; and
    a conduit heater assembly directly coupling the direct reduced iron source and the processing equipment and located between the direct reduced iron source and the processing equipment, wherein the conduit heater assembly is configured to receive a flow of the direct reduced iron from the direct reduced iron source and heat the direct reduced iron as the direct reduced iron flows through the conduit heater assembly and to the processing equipment,
    wherein the conduit heater assembly comprises:
        a conduit configured to directly receive a flow of direct reduced iron, and
        a heating element comprising induction heating coils, disposed adjacent to the conduit, wherein the heating element is configured to transfer energy from a power supply in the form of heat to the conduit and heat the flow of direct reduced iron through the conduit,
        wherein the conduit comprises an insulated outer pipe, and an inner pipe forming an inner conduit and located inside the insulated outer pipe and configured to receive the flow of direct reduced iron, and the heating element is disposed concentrically around an outer surface of the inner conduit and within the insulated outer pipe, and
        wherein the conduit heater assembly forms an elongated feed leg through which the direct reduced iron is heated and flows directly into the processing equipment, which is one of a melter, a briquetting machine, and a hot compaction equipment to compact to a higher density.

2. The system of claim 1, wherein the system is configured to heat the direct reduced iron to between about 700° C. to 750° C.

3. The system of claim 1, wherein the system is configured to heat the direct reduced iron to about 1000° C. or greater.

4. A system for heating direct reduced iron between a direct reduced iron source and processing equipment for the direct reduced iron, comprising:
    a direct reduced iron source;
    processing equipment for the direct reduced iron; and
    a conduit heater assembly directly coupling the direct reduced iron source and the processing equipment and located between the direct reduced iron source and the processing equipment, wherein the conduit heater assembly is configured to receive a flow of the direct reduced iron from the direct reduced iron source and heat the direct reduced iron as the direct reduced iron flows through the conduit heater assembly and to the processing equipment,
    wherein the conduit heater assembly comprises:
        a conduit configured to directly receive a flow of direct reduced iron; and
        a heating element comprising induction heating coils, disposed adjacent to the conduit, wherein the heating element is configured to transfer energy from a power supply in the form of heat to the conduit and heat the flow of direct reduced iron through the conduit,
            wherein a section of the conduit comprises a pipe and is configured to at least one of:
                transition to an annular shaped flow path to receive the flow of direct reduced iron and the heating element comprises a parallel set of induction heating coils, or
                taper out in a first portion of the section of the conduit in a transitional zone to a greater width at a second portion, which transitions to a rectangular shaped flow path, and the induction heating coils comprise rectangular pancake induction heating coils, and wherein the conduit heater assembly forms an elongated feed leg through which the direct reduced iron is heated and flows directly into processing equipment, which is one of a melter, a briquetting machine, and a hot compaction equipment to compact to a higher density.

5. The system of claim 4, wherein the pipe of the section of the conduit transitions to the annular shaped flow path to receive the flow of direct reduced iron and the heating element comprises the parallel set of induction heating coils.

6. The system of claim 4, wherein the first portion of the pipe of the section of the conduit tapers out in the transitional zone to the greater width at the second portion, which transitions to the rectangular shaped flow path, and the induction heating coils comprise the rectangular pancake induction heating coils.

* * * * *